(12) United States Patent
Hwang et al.

(10) Patent No.: US 8,273,475 B2
(45) Date of Patent: Sep. 25, 2012

(54) ENERGY STORAGE DEVICES

(75) Inventors: Jenn-Yeu Hwang, Keelung (TW);
Li-Duan Tsai, Hsinchu (TW);
Chun-Lung Li, Taoyuan County (TW)

(73) Assignee: Industrial Technology Research Institute, Hsinchu (TW)

( * ) Notice: Subject to any disclaimer, the term of this patent is extended or adjusted under 35 U.S.C. 154(b) by 839 days.

(21) Appl. No.: 12/331,338

(22) Filed: Dec. 9, 2008

(65) Prior Publication Data

US 2010/0075223 A1    Mar. 25, 2010

(30) Foreign Application Priority Data

Sep. 23, 2008  (TW) ................... 97136434 A

(51) Int. Cl.
*H01M 2/16*    (2006.01)
(52) U.S. Cl. ........................ 429/137; 429/213
(58) Field of Classification Search .............. 429/137, 429/213
See application file for complete search history.

(56) References Cited

U.S. PATENT DOCUMENTS

| | | | |
|---|---|---|---|
| 5,953,204 A | 9/1999 | Suhara et al. | |
| 6,252,762 B1 | 6/2001 | Amatucci | |
| 6,723,140 B2 * | 4/2004 | Chu et al. | 429/218.1 X |
| 6,828,062 B2 * | 12/2004 | Lu et al. | 429/213 |
| 2004/0197641 A1 * | 10/2004 | Visco et al. | 429/137 |
| 2005/0008934 A1 * | 1/2005 | Oyama et al. | 429/213 |
| 2005/0034993 A1 * | 2/2005 | Gozdz et al. | 205/57 |

FOREIGN PATENT DOCUMENTS

| | | |
|---|---|---|
| CN | 1790571 | 6/2006 |
| CN | 101101817 | 5/2010 |
| WO | WO 2005/096333 A1 | 10/2005 |

OTHER PUBLICATIONS

China Office Action, Office Action, Patent Application Serial No. 200810172632.0, Feb. 23, 2011, China.
China Patent Office, Office Action, Patent Application Serial No. 200810172632.0, Dec. 15, 2011, China.

* cited by examiner

*Primary Examiner* — Stephen J. Kalafut

(57) ABSTRACT

An energy storage device is provided. The energy storage device includes a positive electrode, a negative electrode covered by a protective layer, and an electrolyte. The positive electrode includes fast-energy-storage electrochemical capacitive materials coated on a current collector. The negative electrode includes metal materials capable of having electrochemical reactivity toward lithium ion. The protective layer includes oxides or hydroxides of the metal materials.

7 Claims, 14 Drawing Sheets

ENERGY STORAGE DEVICES

CROSS REFERENCE TO RELATED APPLICATIONS

This Application claims priority of Taiwan Patent Application No. 97136434, filed on Sep. 23, 2008, the entirety of which is incorporated by reference herein.

BACKGROUND OF THE INVENTION

1. Field of the Invention

The invention relates to an energy storage device, and more particularly to an energy storage device with a negative electrode covered by a protective layer.

2. Description of the Related Art

With development of portable electronic products and mobile devices, an energy storage device with high energy, rapid charge/discharge and long-term use is desirable.

Generally, energy storage devices are divided into batteries and capacitors.

For batteries, electric energy is stored through chemical redox, in accordance with long-term small current discharge. Thus, high-energy-density electrode materials capable of long-term use are required. However, the redox is slow. For example, charging for a couple of hours is required, thus making it not suitable for use in high-power output. Additionally, if the batteries are unwillingly operated for delivering high-power output, battery quality will deteriorate.

For capacitors, electric energy is stored through physical charge accumulation. Charge/discharge is rapidly achieved. For example, a high-power supercapacitor is rapidly charged/discharged and provides high current in a very short time. However, their electric energy is stored through physical adsorption/desorption between an electrode and electrolyte-ion, resulting in low energy storage, and is merely applied in emergency power supply.

Thus, development of an energy storage device with high energy and high power is desirable.

In devices, stored energy (E) is proportional to capacity (Q) and working voltage (V) of electrode. A supercapacitor is composed of two high-surface-area carbon or metal oxide symmetric electrodes and aqueous or non-aqueous electrolyte containing ion salt. However, its working voltage merely achieves 1.2V in aqueous electrolyte and 2.5-2.7V in non-aqueous electrolyte, respectively. Also, metal oxides with redox capability such as $RuO_2$ are expensive. To improve applicable potential window and working voltage, various devices with asymmetric electrodes have been developed. That is, positive and negative electrodes are composed of different materials have been developed.

U.S. Pat. No. 5,953,204 discloses an electric double-layer capacitor comprising an activated carbon positive electrode and a negative electrode, with an operation voltage of 4.0V. The negative electrode comprises a porous nickel current collector, without formation of alloy with lithium ion, with a carbon material capable of lithium ion intercalation/deintercalation therebetween formed thereon. WO 2005/096333 discloses an organic electrolyte capacitor comprising an activated carbon positive electrode and a mesoporous carbon negative electrode capable of lithium ion intercalation therebetween, with a working voltage of 4.0V. However, lithium is easily deposited on a carbon surface during rapid charge/discharge and penetrates a separator to result in short circuiting due to the intercalation reaction potential between the carbon and lithium ion when nearing 0V. Additionally, to achieve high capacity, the foregoing carbon negative electrode with a specific structure is required, thus chemical fabrication is complex and expensive. U.S. Pat. No. 6,252,762 discloses a capacitor comprising an activated carbon positive electrode and a $Li_4Ti_5O_{12}$ negative electrode capable of lithium ion intercalation therebetween, with a working voltage of 3.0V. However, the reaction potential between $Li_4Ti_5O_{12}$ and lithium ion is about 1.5V higher than that between carbon and lithium ion, resulting in a narrow applicable potential window. Also, the material shows good capacity retention only under a specific synthesis condition that is complicated and hard to control.

Among the foregoing negative electrode materials, the theoretical capacity of carbon is 372 mAh/g, however, lithium is easily deposited on a carbon surface during rapid charge/discharge and penetrates a separator to result in short circuiting due to the intercalation reaction potential between the carbon and lithium ion when nearing 0V. The reaction potential between $Li_4Ti_5O_{12}$ and lithium ion is about 1.5V higher than that between carbon and lithium ion. Although safety is promoted, an applicable potential window is narrowed. Additionally, a great quantity of $Li_4Ti_5O_{12}$ is required to prepare a large capacity device due to its low capacity of 140-160 mAh/g, increasing device weight.

Additionally, some metal materials, for example, antimony, bismuth, silicon, tin, lead, aluminum, gallium, indium, cadmium or zinc capable of reaction with lithium ion to form alloy are also used as a negative electrode, wherein they have a higher capacity than carbon. However, when lithium ion is intercalated into such negative electrode materials to form an alloy, the metal material is expanded, and when lithium ion is deintercalated from the alloy, it is contracted to its original size. Stresses generated from violent volume expansions and contractions during intercalation/deintercalation causes material cracks, reducing device lifespan. Thus, when such alloy negative electrodes are utilized, stability of the electrode structure should be considered.

BRIEF SUMMARY OF THE INVENTION

One embodiment of the invention provides an energy storage device comprising a positive electrode, a negative electrode covered by a protective layer, and an electrolyte.

The positive electrode comprises fast-energy-storage electrochemical capacitive materials coated on a current collector. The negative electrode comprises metal materials capable of having electrochemical reactivity toward lithium ion. The metal material (negative electrode) is further covered by the protective layer. The protective layer comprises oxides or hydroxides of the metal materials. The metal material may serve as a current collector. The electrolyte containing lithium salt is filled between the positive and negative electrodes. The energy storage device possesses high energy and rapid charge/discharge capability.

A detailed description is given in the following embodiments with reference to the accompanying drawings.

BRIEF DESCRIPTION OF THE DRAWINGS

The invention can be more fully understood by reading the subsequent detailed description and examples with references made to the accompanying drawing, wherein.

DETAILED DESCRIPTION OF THE INVENTION

Figure 1:
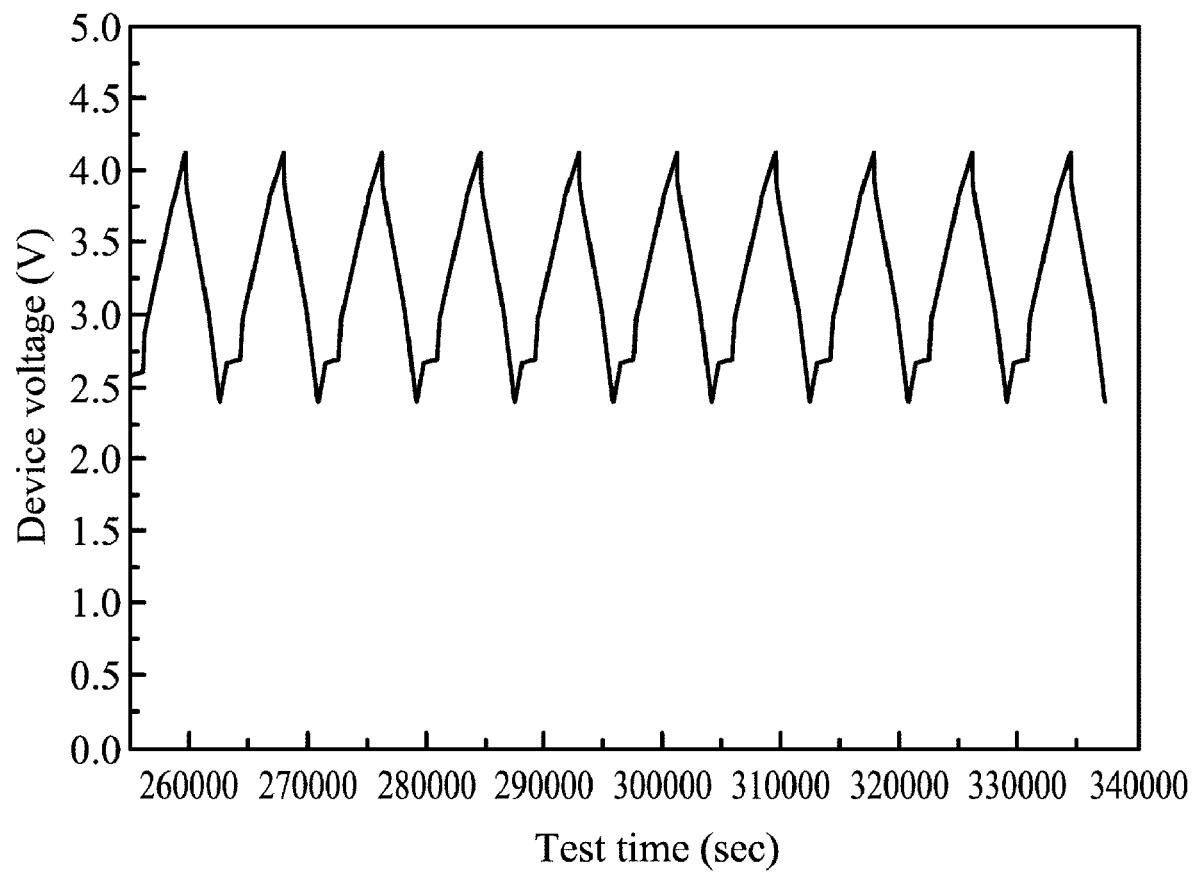
FIG. 1 shows charge/discharge curves of an energy storage device with an activated carbon/aluminum (covered by a protective layer formed by 2.0V forming voltage) asymmetric electrode structure under constant-current charge/discharge cycling in an embodiment of the invention.

The following description is of the best-contemplated mode of carrying out the invention. This description is made for the purpose of illustrating the general principles of the invention and should not be taken in a limiting sense. The scope of the invention is best determined by reference to the appended claims.

One embodiment of the invention provides an energy storage device comprising a positive electrode, a negative electrode covered by a protective layer, and an electrolyte.

The invention provides an asymmetric electrode structure. The positive electrode may comprise fast-energy-storage electrochemical capacitive materials coated on a current collector. The negative electrode may comprise metal materials capable of having electrochemical reactivity toward lithium ion. The metal material may serve as a current collector. The metal material (negative electrode) is further covered by the protective layer. The protective layer may comprise oxides or hydroxides of the metal materials. The electrolyte containing lithium salt is filled between the positive and negative electrodes. The energy storage device possesses high energy and rapid charge/discharge capability.

The fast-energy-storage electrochemical capacitive materials (positive electrode) may comprise activated carbon or conductive polymers. An activated carbon positive electrode utilizes an energy storage mechanism of reversible electrolyte-ion adsorption/desorption to achieve rapid charge/discharge, with a capacity of about 20-30 mAh/g. Energy stored by devices is proportional to capacity of electrode materials. In addition to activated carbon, conductive polymers with rapid reversible doping/undoping, for example, polyaniline, polypyrrole, polythiophene or derivatives thereof are also suitable for use as positive electrode materials, with a capacity of about 40-70 mAh/g. Preferably the polythiophene derivatives such as poly(3-methylthiophene) (PMeT), poly(3,4-ethylenedioxythiophene) (PEDOT) or poly(3-(4-fluorophenylthiophene)) (PFPT), possessing higher stability and reaction potential than others, facilitating increase of working voltage of devices, is used. Energy stored by devices is proportional to working voltage of electrode materials. Thus, these conductive polymers such as poly(3-methylthiophene) (PMeT), poly(3,4-ethylenedioxythiophene) (PEDOT) and poly(3-(4-fluorophenylthiophene)) (PFPT) facilitate improvement of energy density of devices. The positive electrode may comprise activated carbon, conductive polymers or combinations thereof coated on a current collector. The current collector may comprise superior conductive materials such as aluminum, nickel, stainless steel, carbon or platinum, preferably aluminum.

The negative electrode materials with a higher capacity than that of the positive electrode materials such as carbon (372 mAh/g), for example, antimony, bismuth, silicon, tin, lead, aluminum, gallium, indium, cadmium or zinc react with lithium ion to form alloy through electrochemical reaction. In the invention, the negative electrode materials may serve as a current collector. Thus, metal materials with superior conductivity are preferable. Among the metal materials, aluminum has a density of 2.70 g/cm$^3$, which is lower than some others (antimony (6.68 g/cm$^3$), bismuth (9.79 g/cm$^3$), tin (7.31 g/cm$^3$), lead (11.34 g/cm$^3$), gallium (5.91 g/cm$^3$), indium (7.31 g/cm$^3$), zinc (7.14 g/cm$^3$) or cadmium (8.65 g/cm$^3$)). When an aluminum foil is utilized as a negative electrode and a current collector, the device possesses an increased energy density due to the aluminum being lighter than conventional negative electrode current collector materials such as copper or nickel, and having a simple fabrication, without coating, drying and roll pressing. Additionally, the reaction potential (0.2-0.5V) of intercalation/deintercalation between aluminum and lithium ion is higher than that between carbon and lithium ion, effectively avoiding short circuiting. To overcome the alloy's negative electrode crack in charge/discharge cycling, a protective layer capable of forming a stable matrix with lithium ion in electrolyte during an electrochemical process is further formed on the surface of the aluminum negative electrode to stabilize the electrode structure, improving capacity retention of devices in long-term charge/discharge cycling. The protective layer is formed by applying a chemical or electrochemical treatment on the surface of the aluminum foil to form oxides or hydroxides thereof. The thickness of the protective layer is determined by a forming voltage of about 1.3 nm/V. Generally, the protective layer has a thickness of about 1-200 nm, preferably 1-50 nm.

The electrolyte may comprise lithium salts, for example, $LiPF_6$, $LiBF_4$, $LiClO_4$, $LiB(C_2O_4)_2$, $LiAsF_6$, $LiCF_3SO_3$, $LiN(CF_3SO_2)_2$, $LiN(C_2F_5SO_2)_2$ or $LiC(CF_3SO_2)_3$.

To conclude, the invention provides asymmetric positive and negative electrode structures with various materials to sufficiently increase working voltage of devices, achieving high energy thereof.

Example 1

Preparation of an Activated Carbon/Aluminum Foil (Covered by a Protective Layer) Asymmetric Electrode Structure (1)

Activated carbon powders (Norit® SX Ultra activated carbon) were added to a binder solution prepared by dissolving CMC (Carboxymethylcellulose, sodium salt) in deionized water/methanol (volume ratio 1:1) with stirring, until uniform slurry was obtained. In the slurry, the weight ratio of the activated carbon and binder was 90:10. The slurry was then coated on an aluminum foil by a doctor blade to prepare an electrode. After the solvent was vaporized, the electrode was baked in a vacuum oven. After pressed by a roll machine, the electrode was cut to a required size.

Next, an aluminum foil was chemically or electrochemically treated to prepare a negative electrode with a protective layer containing oxides or hydroxides formed thereon. The forming voltage was 2.0V.

A device comprising the activated carbon-coated aluminum foil positive electrode (0.0220 g), the etched aluminum foil negative electrode (2.0V formed, 0.0158 g) and $LiPF_6$ electrolyte was prepared. The device was tested under a constant current of 0.25 mA. The rest interval between each charge/discharge cycle was 30 minutes. FIG. 1 shows charge/discharge curves of the device under constant-current charge/discharge cycling. The working voltage of the device ranged from 2.4 to 4.2V. The energy density of the device was 17.9 Wh/kg.

Example 2

Preparation of an Activated Carbon/Aluminum Foil (Covered by a Protective Layer) Asymmetric Electrode Structure (2)

Activated carbon powders (Norit® A Supra) were added to a binder solution prepared by dissolving conductive carbon and a binder in deionized water with stirring, until uniform slurry was obtained. In the slurry, the weight ratio of the activated carbon, conductive carbon and binder was 100:5:10. The slurry was then coated on an aluminum foil by a doctor blade to prepare an electrode. After the solvent was vaporized, the electrode was baked in a vacuum oven. After pressed by a roll machine, the electrode was cut to a required size.

An aluminum foil was chemically or electrochemically treated to prepare a negative electrode with a protective layer containing oxides or hydroxides formed thereon. The forming voltage was 4.0V.

Figure 2:
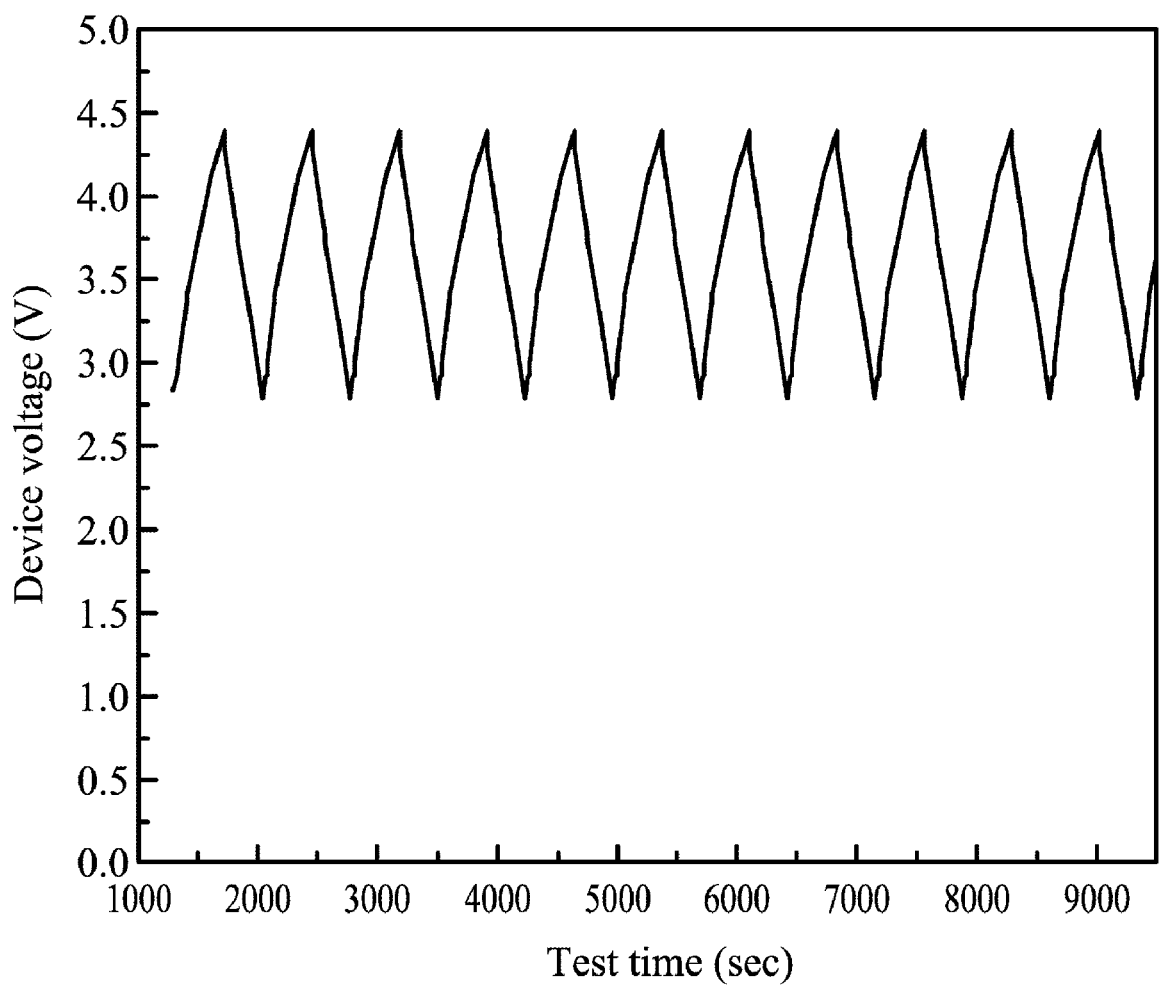
FIG. 2 shows charge/discharge curves of an energy storage device with an activated carbon/aluminum (covered by a protective layer formed by 4.0V forming voltage) asymmetric electrode structure under constant-current charge/discharge cycling in an embodiment of the invention.

A device comprising the activated carbon-coated aluminum foil positive electrode (0.0097 g), the etched aluminum foil negative electrode (4.0V formed, 0.0158 g) and $LiPF_6$ electrolyte was prepared. The device was tested under a constant current of 1 mA. The rest interval between each charge/discharge cycle was 30 seconds. FIG. 2 shows charge/discharge curves of the device under constant-current charge/discharge cycling. The working voltage of the device ranged from 2.8 to 4.4V. The energy density of the device was 13.3 Wh/kg.

Figure 3:
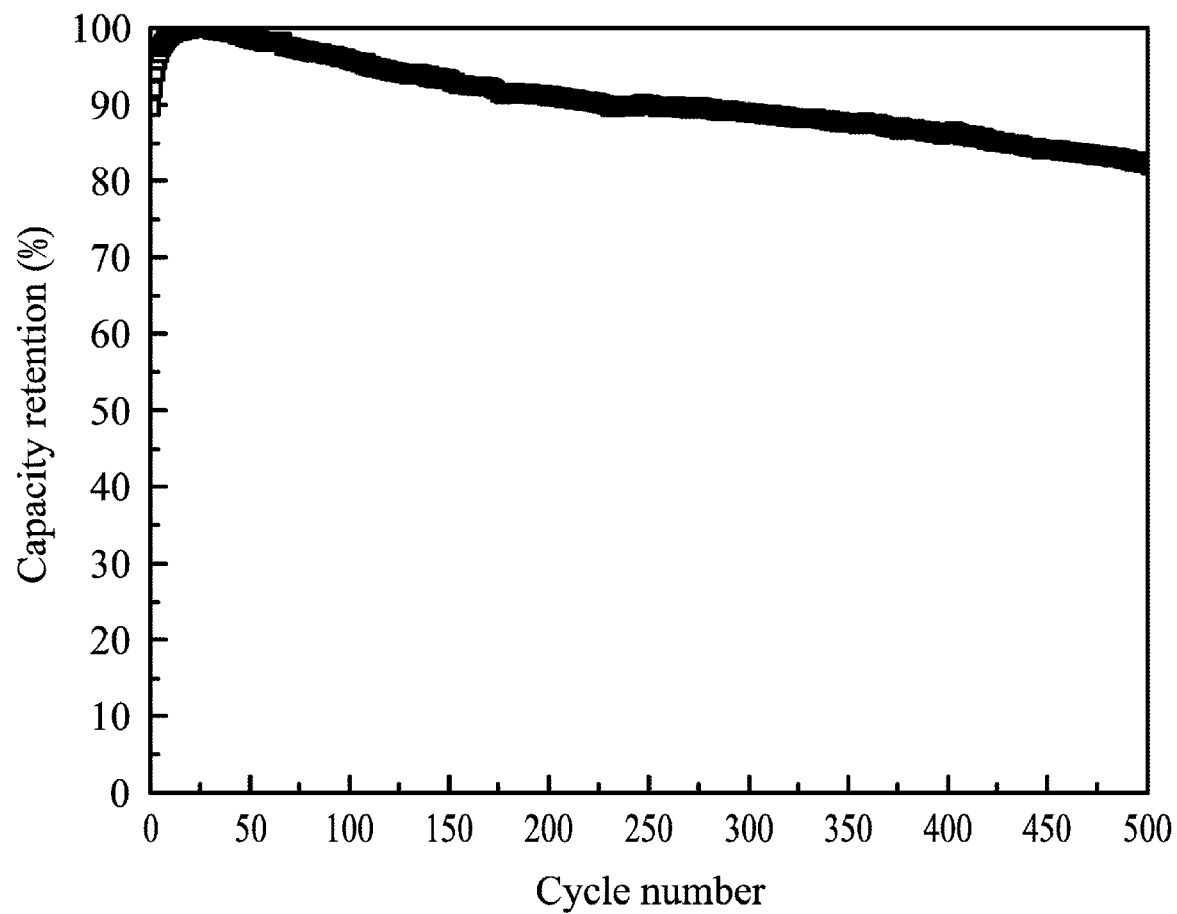
FIG. 3 shows a relationship between capacity retention and cycle number of an energy storage device with an activated carbon/aluminum (covered by a protective layer formed by 4.0V forming voltage) asymmetric electrode structure under 1 mA in charge/discharge cycling in an embodiment of the invention.

FIG. 3 shows a relationship between capacity retention and cycle number of the device under 1 mA in charge/discharge cycling. After 500 charge/discharge cycles, the capacity retention thereof was about 82.2%.

Example 3

Preparation of an Activated Carbon/Aluminum Foil (Covered by a Protective Layer) Asymmetric Electrode Structure (3)

Activated carbon powders (Norit® A Supra) were added to a binder solution prepared by dissolving conductive carbon and a binder in deionized water with stirring, until uniform slurry was obtained. In the slurry, the weight ratio of the activated carbon, conductive carbon and binder was 100:5:10. The slurry was then coated on an aluminum foil by a doctor blade to prepare an electrode. After the solvent was vaporized, the electrode was baked in a vacuum oven. After pressed by a roll machine, the electrode was cut to a required size.

An aluminum foil was chemically or electrochemically treated to prepare a negative electrode with a protective layer containing oxides or hydroxides formed thereon. The forming voltage was 6.0V.

Figure 4:
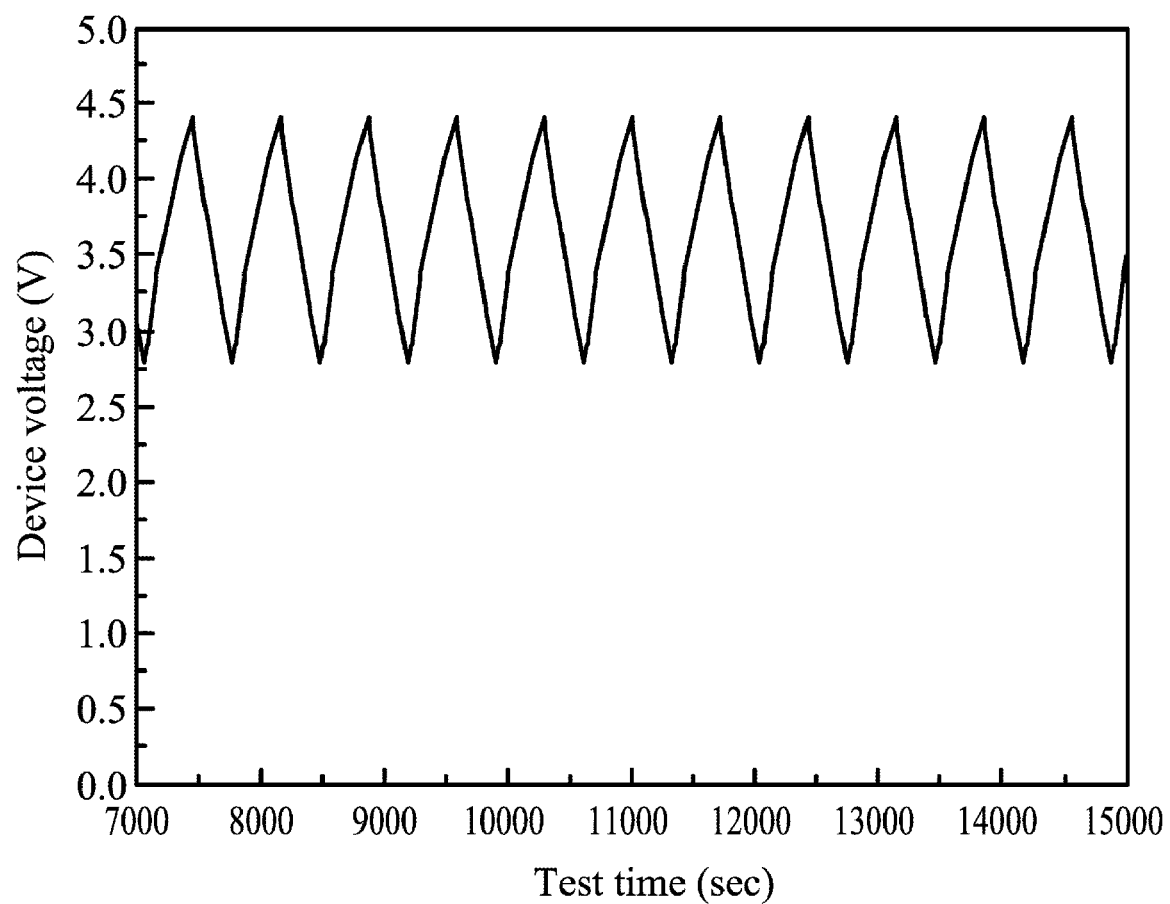
FIG. 4 shows charge/discharge curves of an energy storage device with an activated carbon/aluminum (covered by a protective layer formed by 6.0V forming voltage) asymmetric electrode structure under constant-current charge/discharge cycling in an embodiment of the invention.

A device comprising the activated carbon-coated aluminum foil positive electrode (0.0097 g), the etched aluminum foil negative electrode (6.0V formed, 0.0158 g) and $LiPF_6$ electrolyte was prepared. The device was tested under a constant current of 1 mA. The rest interval between each charge/discharge cycle was 30 seconds. FIG. 4 shows charge/discharge curves of the device under constant-current charge/discharge cycling. The working voltage of the device ranged from 2.8 to 4.4V. The energy density of the device was 13 Wh/kg.

Figure 5:
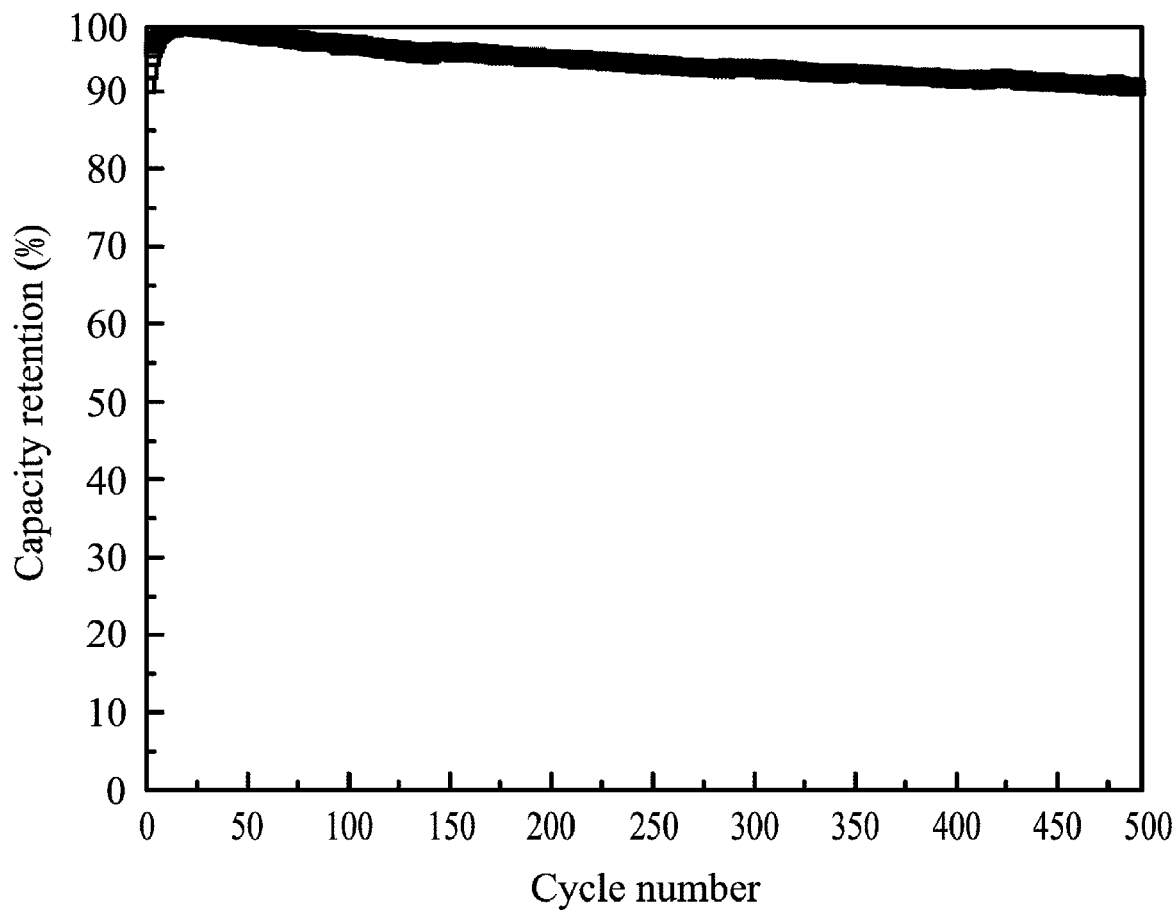
FIG. 5 shows a relationship between capacity retention and cycle number of an energy storage device with an activated carbon/aluminum (covered by a protective layer formed by 6.0V forming voltage) asymmetric electrode structure under 1 mA in charge/discharge cycling in an embodiment of the invention.

FIG. 5 shows a relationship between capacity retention and cycle number of the device under 1 mA in charge/discharge cycling. After 500 charge/discharge cycles, the capacity retention thereof was about 92.0%.

Example 4

Preparation of a Conductive Polymer/Aluminum Foil (Covered by a Protective Layer) Asymmetric Electrode Structure (1)

3-methylthiophene and $FeCl_3$ were added to trichloromethane and reacted for 5 hours controlled by an ice bath. After filtration and washing by methanol and deionized water, the products were baked at 70° C. under vacuum to prepare PMeT powders.

Next, the PMeT powders and conductive carbon were mixed and then added to a binder solution prepared by dissolving CMC (Carboxymethylcellulose, sodium salt) in deionized water/methanol (volume ratio 1:1) with stirring, until uniform slurry was obtained. In the slurry, the weight ratio of the PMeT, conductive carbon and binder was 70:20:10. The slurry was then coated on an aluminum foil by a doctor blade to prepare an electrode. After the solvent was vaporized, the electrode was baked in a vacuum oven. After pressed by a roll machine, the electrode was cut to a required size.

An aluminum foil was chemically or electrochemically treated to prepare a negative electrode with a protective layer containing oxides or hydroxides formed thereon. The forming voltage was 6.0V.

Figure 6:
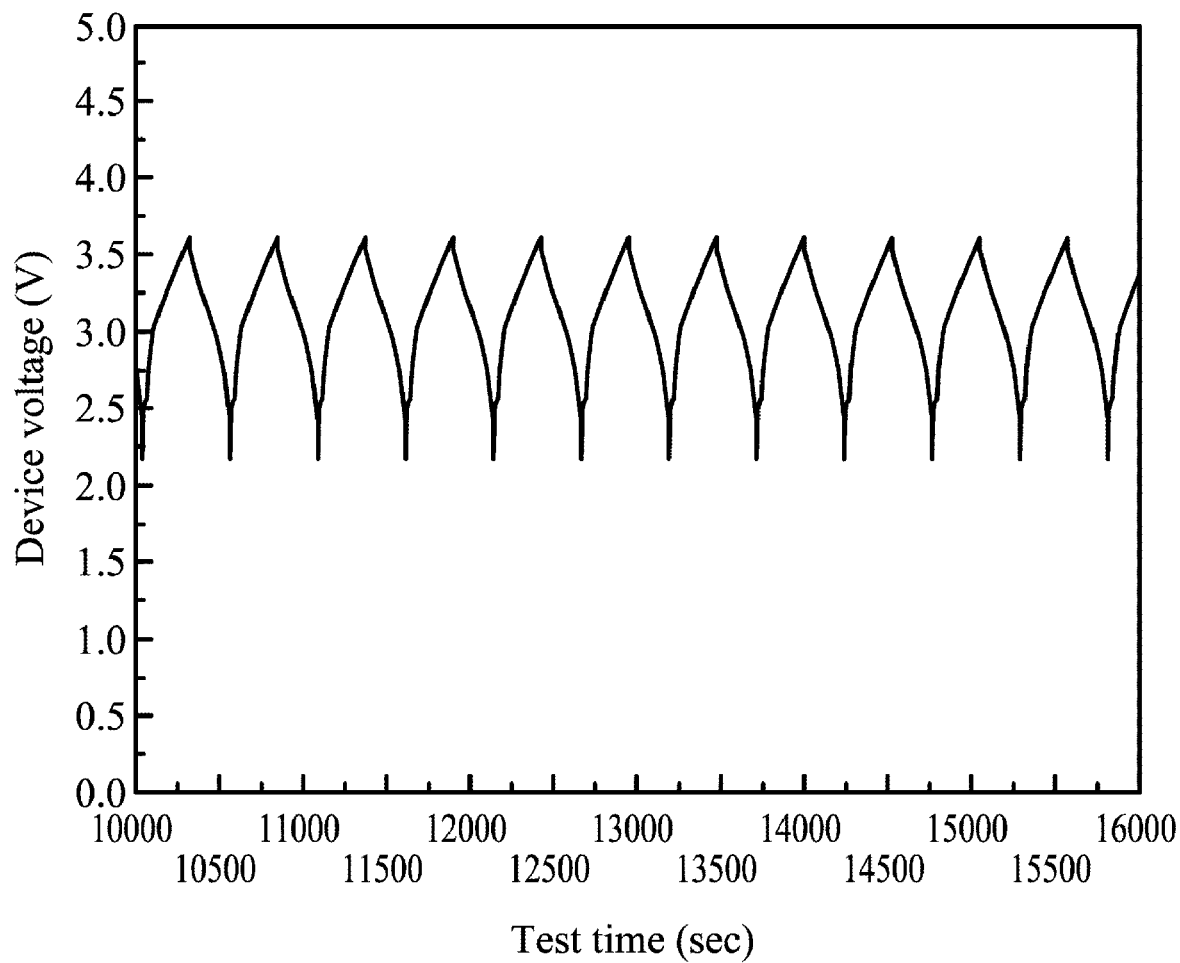
FIG. 6 shows charge/discharge curves of an energy storage device with a PMeT/aluminum (covered by a protective layer formed by 6.0V forming voltage) asymmetric electrode structure under constant-current charge/discharge cycling in an embodiment of the invention.

A device comprising the PMeT-coated aluminum foil positive electrode (0.0106 g), the etched aluminum foil negative electrode (6.0V formed, 0.0158 g) and LiPF$_6$ electrolyte was prepared. The device was tested under a constant current of 2 mA. The rest interval between each charge/discharge cycle was 30 seconds. FIG. 6 shows charge/discharge curves of the device under constant-current charge/discharge cycling. The working voltage of the device ranged from 2.2 to 3.6V. The energy density of the device was 16.0 Wh/kg.

Figure 7:
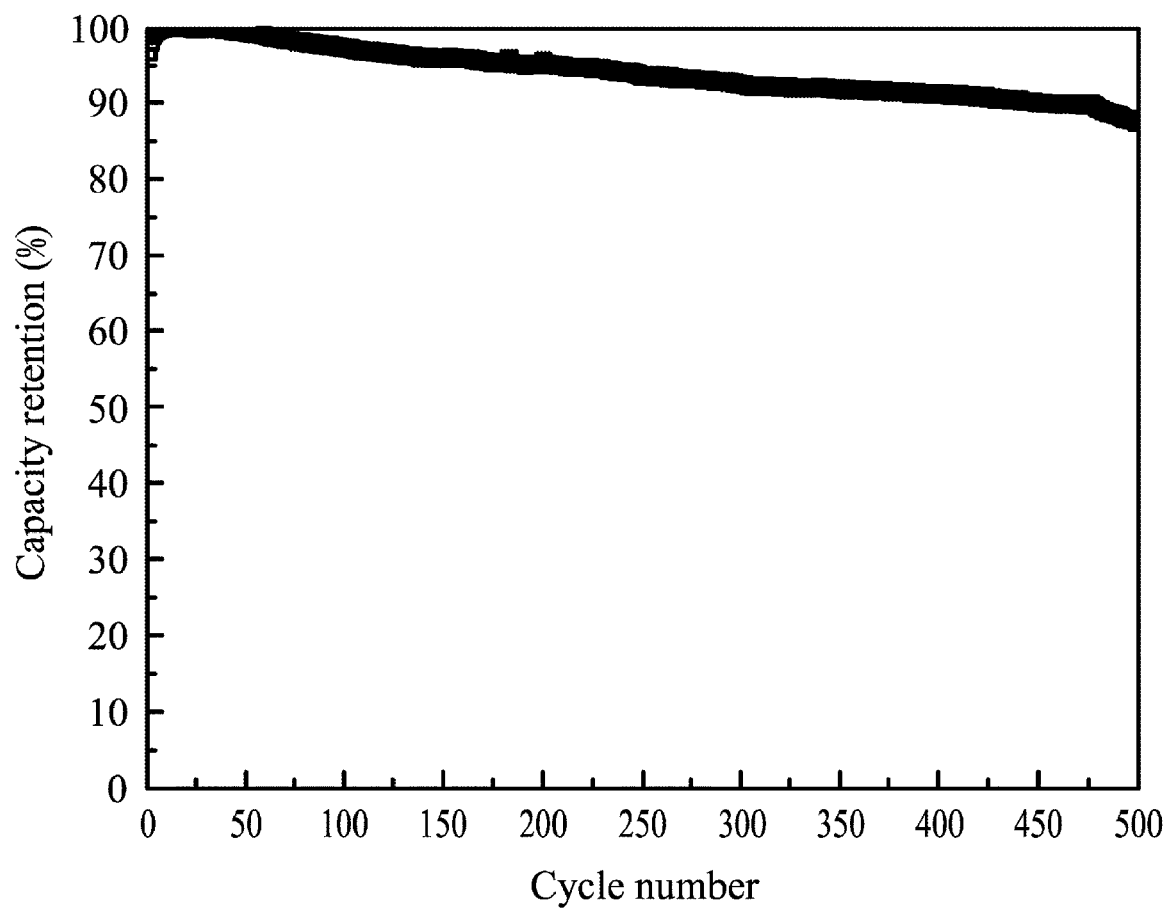
FIG. 7 shows a relationship between capacity retention and cycle number of an energy storage device with a PMeT/aluminum (covered by a protective layer formed by 6.0V forming voltage) asymmetric electrode structure under 2 mA in charge/discharge cycling in an embodiment of the invention.

FIG. 7 shows a relationship between capacity retention and cycle number of the device under 2 mA in charge/discharge cycling. After 500 charge/discharge cycles, the capacity retention thereof was about 87.5%.

Example 5

Preparation of a Conductive Polymer/Aluminum Foil (Covered by a Protective Layer) Asymmetric Electrode Structure (2)

3,4-ethylenedioxythiophene (EDOT) and Iron(III) p-toluenesulfonate (1:1.5 mole) were added to n-butanol and reacted for 5 hours controlled by an ice bath. After filtration and washing by methanol and deionized water, the products were baked at 70° C. under vacuum to prepare PEDOT powders.

Next, the PEDOT powders, and conductive carbon were mixed and then added to a binder solution prepared by dissolving EPDM rubber in n-heptane with stirring, until uniform slurry was obtained. In the slurry, the weight ratio of the PEDOT, conductive carbon and binder was 70:20:10. The slurry was then coated on an aluminum foil by a doctor blade to prepare an electrode. After the solvent was vaporized, the electrode was baked in a vacuum oven. After pressed by a roll machine, the electrode was cut to a required size.

An aluminum foil was chemically or electrochemically treated to prepare a negative electrode with a protective layer containing oxides or hydroxides formed thereon. The forming voltage was 6.0V.

Figure 8:
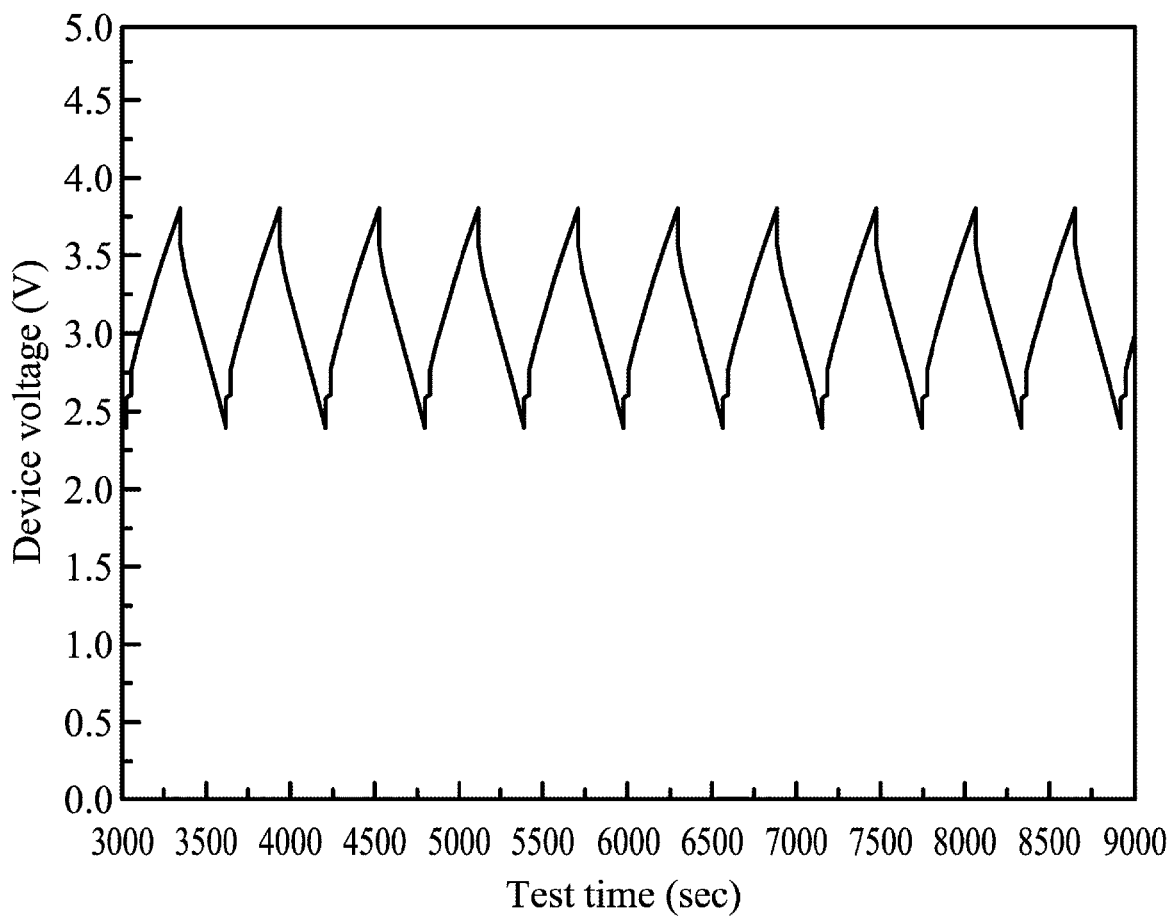
FIG. 8 shows charge/discharge curves of an energy storage device with a PEDOT/aluminum (covered by a protective layer formed by 6.0V forming voltage) asymmetric electrode structure under constant-current charge/discharge cycling in an embodiment of the invention.

A device comprising the PEDOT-coated aluminum foil positive electrode (0.0140 g), the etched aluminum foil negative electrode (6.0V formed, 0.0158 g) and LiPF$_6$ electrolyte was prepared. The device was tested under a constant current of 1.5 mA. The rest interval between each charge/discharge cycle was 30 seconds. FIG. 8 shows charge/discharge curves of the device under constant-current charge/discharge cycling. The working voltage of the device ranged from 2.4 to 3.8V. The energy density of the device was 11.7 Wh/kg.

Figure 9:
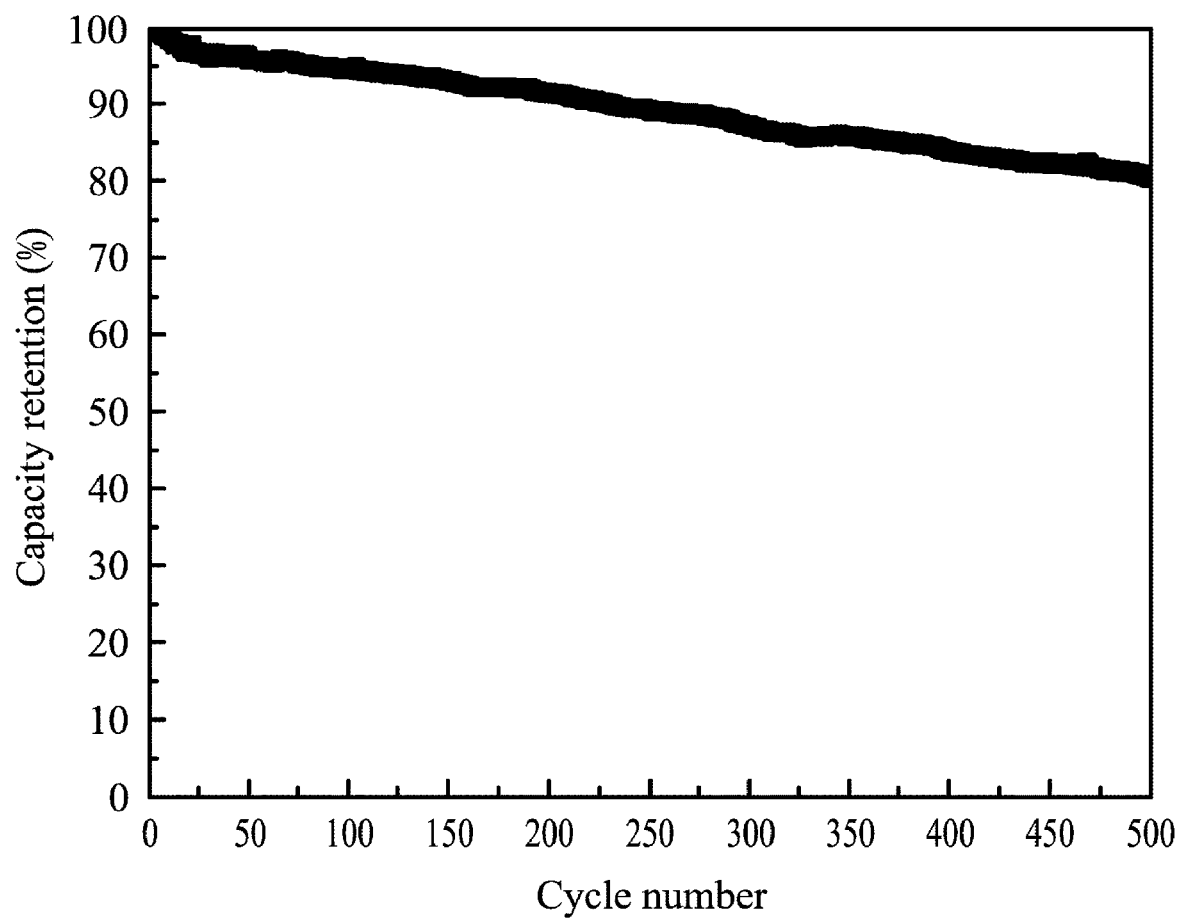
FIG. 9 shows a relationship between capacity retention and cycle number of an energy storage device with a PEDOT/aluminum (covered by a protective layer formed by 6.0V forming voltage) asymmetric electrode structure under 1.5 mA in charge/discharge cycling in an embodiment of the invention.

FIG. 9 shows a relationship between capacity retention and cycle number of the device under 1.5 mA in charge/discharge cycling. After 500 charge/discharge cycles, the capacity retention thereof was about 80.5%.

Comparative Example 1

Preparation of an Activated Carbon/Activated Carbon Symmetric Electrode Structure Activated carbon powders (Norit® SX Ultra activated carbon) were added to a binder solution prepared by dissolving CMC (Carboxymethylcellulose, sodium salt) in deionized water/methanol (volume ratio 1:1) with stirring, until uniform slurry was obtained. In the slurry, the weight ratio of the activated carbon and binder was 90:10. The slurry was then coated on an aluminum foil by a doctor blade to prepare an electrode. After the solvent was vaporized, the electrode was baked in a vacuum oven. After pressed by a roll machine, the electrode was cut to a required size.

Figure 10:
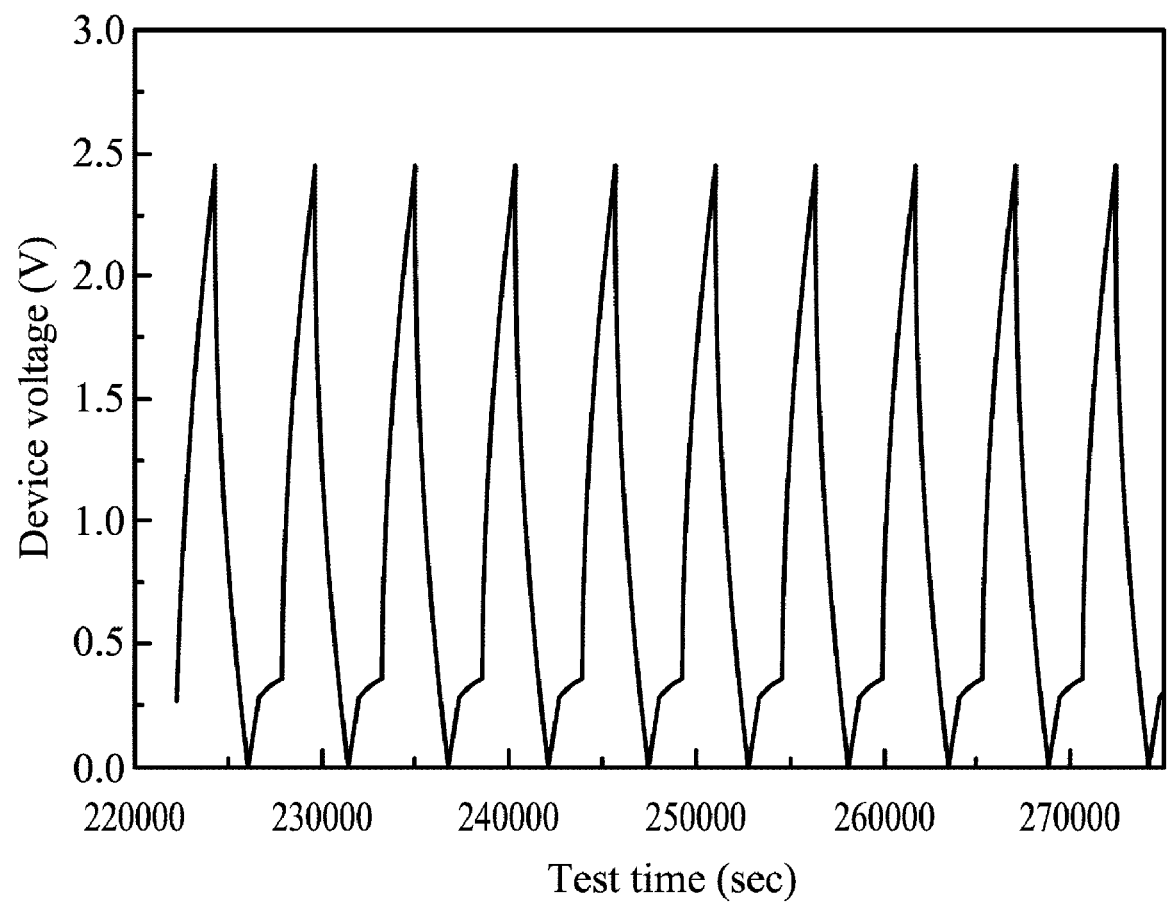
FIG. 10 shows charge/discharge curves of an energy storage device with an activated carbon/activated carbon symmetric electrode structure under constant-current charge/discharge cycling in an embodiment of the invention.

A device comprising a positive electrode and a negative electrode with two same activated carbon-coated aluminum foils (0.0197 g), and LiPF$_6$ electrolyte was prepared. The device was tested under a constant current of 0.42 mA. The rest interval between each charge/discharge cycle was 30 minutes. FIG. 10 shows charge/discharge curves of the device under constant-current charge/discharge cycling. The working voltage of the device ranged from 0 to 2.5V. The energy density of the device was 3.59 Wh/kg.

Comparative Example 2

Preparation of a Conductive Polymer/Aluminum Foil Asymmetric Electrode Structure 3-methylthiophene and FeCl$_3$ were added to trichloromethane and reacted for 5 hours controlled by an ice bath. After filtration and washing by methanol and deionized water, the products were baked at 70° C. under vacuum to prepare PMeT powders.

Next, the PMeT powders and conductive carbon were mixed and then added to a binder solution prepared by dissolving CMC (Carboxymethylcellulose, sodium salt) in deionized water/methanol (volume ratio 1:1) with stirring, until uniform slurry was obtained. In the slurry, the weight ratio of the PMeT, conductive carbon and binder was 70:20:10. The slurry was then coated on an aluminum foil by a doctor blade to prepare an electrode. After the solvent was vaporized, the electrode was baked in a vacuum oven. After pressed by a roll machine, the electrode was cut to a required size.

Figure 11:
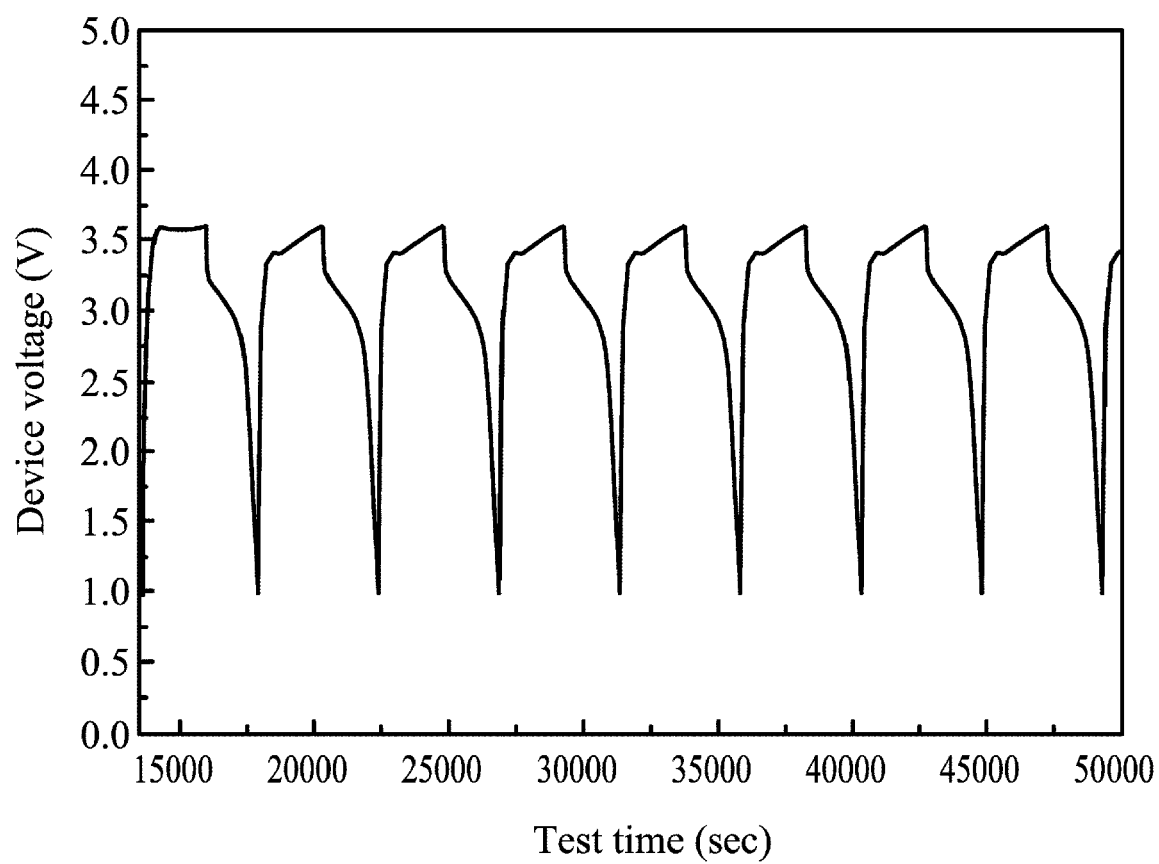
FIG. 11 shows charge/discharge curves of an energy storage device with a conductive polymer/aluminum asymmetric electrode structure under constant-current charge/discharge cycling in an embodiment of the invention.

A device comprising the PMeT-coated aluminum foil positive electrode (0.0195 g), an aluminum foil negative electrode (without etching and without forming) (0.0120 g) and LiPF$_6$ electrolyte was prepared. The device was continuously tested under a constant current of 0.18375 mA. FIG. 11 shows charge/discharge curves of the device under constant-current charge/discharge cycling. The working voltage of the device ranged from 1.0 to 3.6V. The energy density of the device was 8.21 Wh/kg.

Comparative Example 3

Preparation of an Activated Carbon/Aluminum Foil Asymmetric Electrode Structure

Activated carbon powders (Norit® SX Ultra activated carbon) were added to a binder solution prepared by dissolving CMC (Carboxymethylcellulose, sodium salt) in deionized water/methanol (volume ratio 1:1) with stirring, until uniform slurry was obtained. In the slurry, the weight ratio of the activated carbon and binder was 90:10. The slurry was then coated on an aluminum foil by a doctor blade to prepare an electrode. After the solvent was vaporized, the electrode was baked in a vacuum oven. After pressed by a roll machine, the electrode was cut to a required size.

Figure 12:
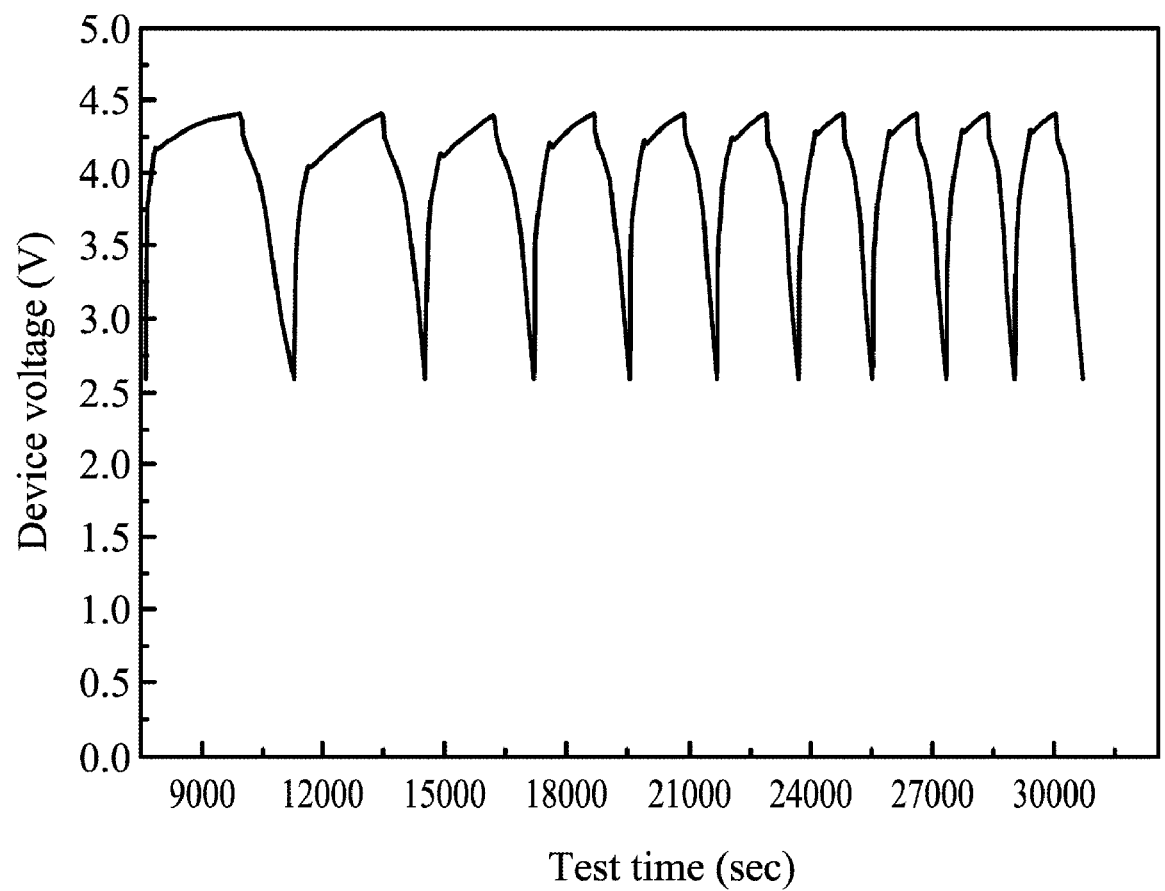
FIG. 12 shows charge/discharge curves of an energy storage device with an activated carbon/aluminum asymmetric electrode structure under constant-current charge/discharge cycling in an embodiment of the invention.

A device comprising the activated carbon-coated aluminum foil positive electrode (0.0197 g), an etched aluminum foil negative electrode (without forming) (0.0125 g) and LiPF$_6$ electrolyte was prepared. The device was tested under a constant current of 0.21 mA. FIG. 12 shows charge/discharge curves of the device under constant-current charge/ discharge cycling. The working voltage of the device ranged from 2.6 to 4.4V. The energy density of the device was 8.26 Wh/kg.

Comparative Example 4

Preparation of an Activated Carbon/Activated Carbon Symmetric Electrode Structure Activated carbon powders (Norit® A Supra) were added to a binder solution prepared by dissolving conductive carbon and a binder in deionized water with stirring, until uniform slurry was obtained. In the slurry, the weight ratio of the activated carbon, conductive carbon and binder was 100:5:10. The slurry was then coated on an aluminum foil by a doctor blade to prepare an electrode. After the solvent was vaporized, the electrode was baked in a vacuum oven. After pressed by a roll machine, the electrode was cut to a required size.

Figure 13:
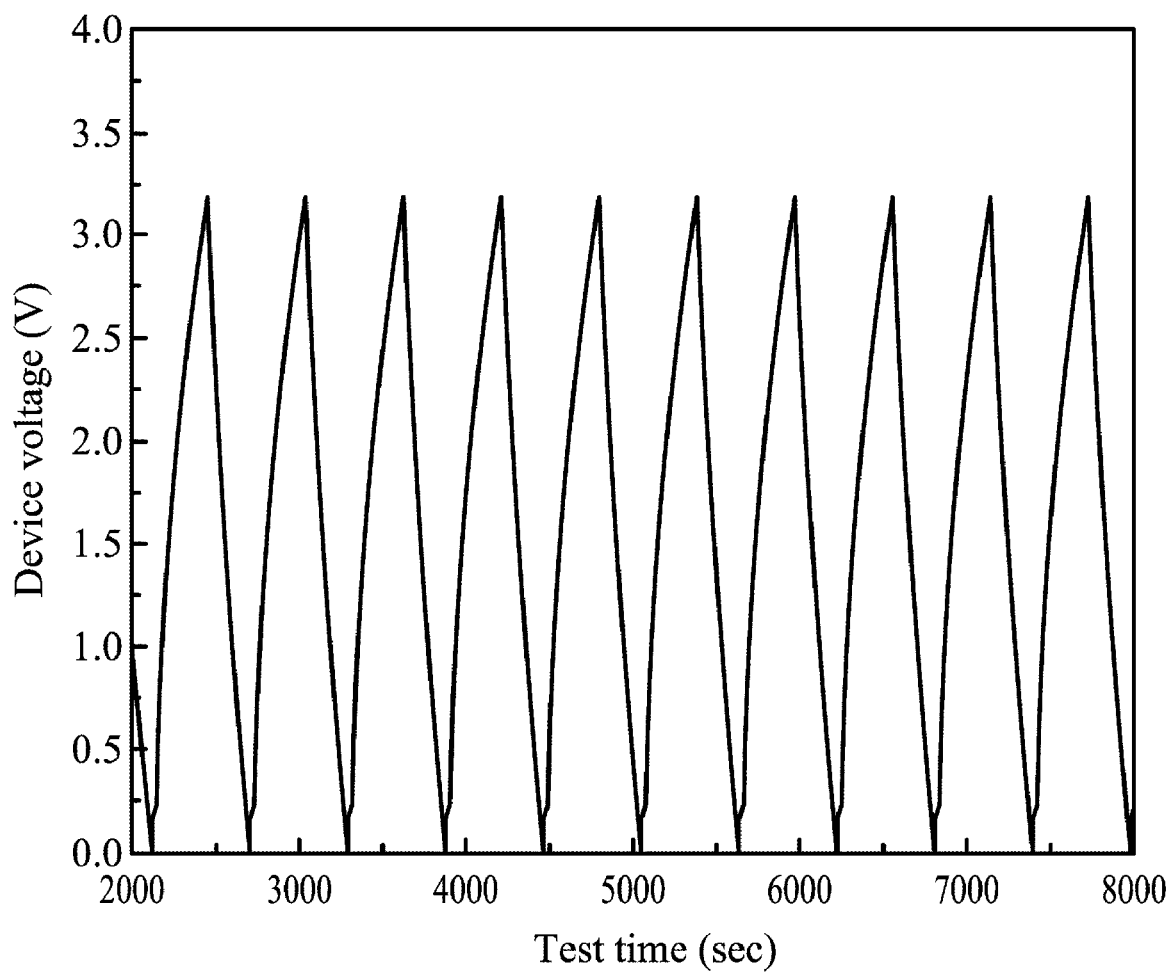
FIG. 13 shows charge/discharge curves of an energy storage device with an activated carbon/activated carbon symmetric electrode structure under constant-current charge/discharge cycling in an embodiment of the invention.

A device comprising a positive electrode and a negative electrode with two same activated carbon-coated aluminum foils (0.0100 g), and LiPF$_6$ electrolyte was prepared. The device was tested under a constant current of 1 mA. The rest interval between each charge/discharge cycle was 30 seconds. FIG. 13 shows charge/discharge curves of the device under constant-current charge/discharge cycling. The working voltage of the device ranged from 0 to 3.2V. The energy density of the device was 4.77 Wh/kg.

Figure 14:
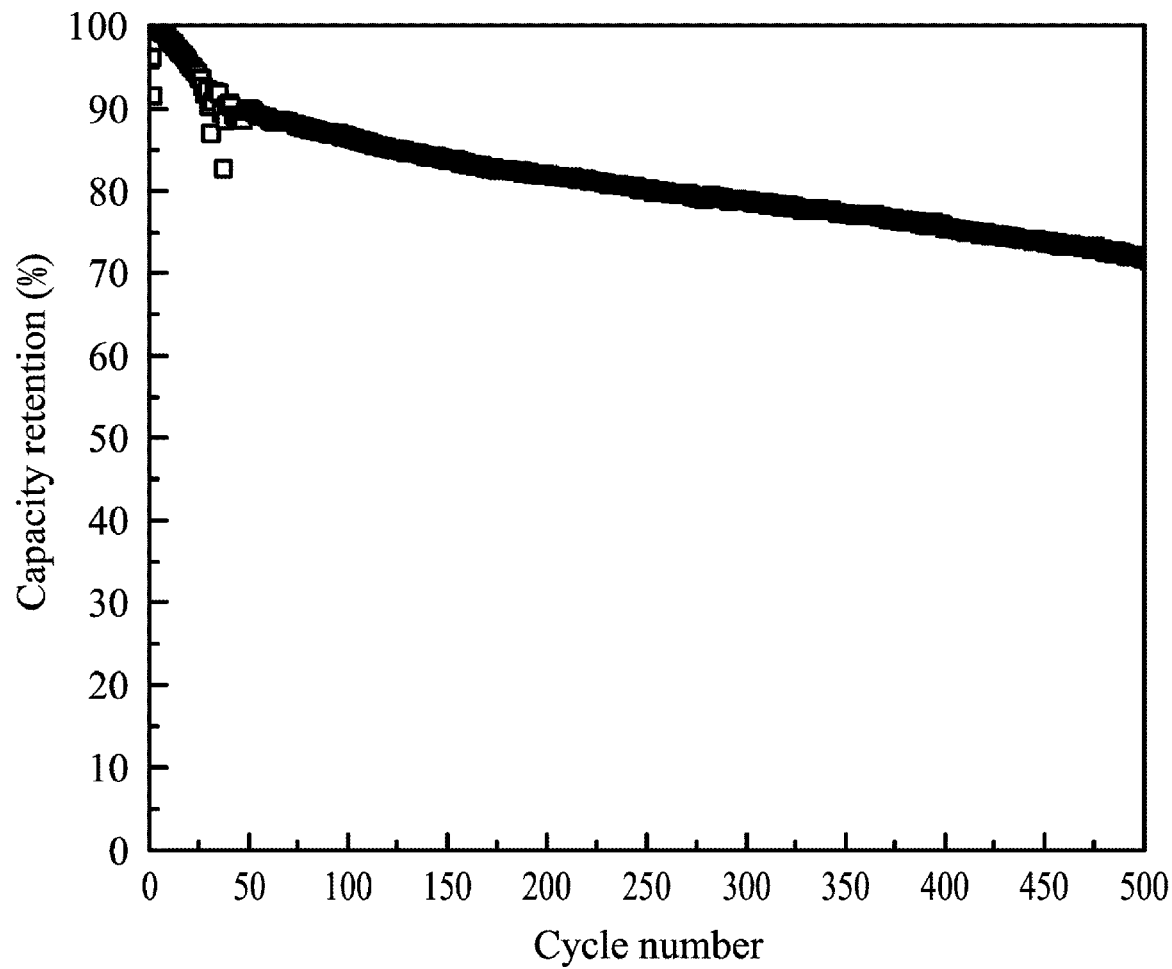
FIG. 14 shows a relationship between capacity retention and cycle number of an energy storage device with an activated carbon/activated carbon symmetric electrode structure under 1 mA in charge/discharge cycling in an embodiment of the invention.

FIG. 14 shows a relationship between capacity retention and cycle number of the device under 1 mA in charge/discharge cycling. After 500 charge/discharge cycles, the capacity retention thereof was about 72%.

The data of Examples 1-5 and Comparative Examples 1-4 are shown in Tables 1 and 2.

TABLE 1

| Ex | Positive electrode | Negative electrode | Working voltage (V) | Energy density (Wh/kg) |
|---|---|---|---|---|
| Comparative Example 1 | Activated carbon | Activated carbon | 0.0-2.5 | 3.59 |
| Comparative Example 2 | PMeT | Aluminum foil | 1.0-3.6 | 8.21 |
| Comparative Example 3 | Activated carbon | Aluminum foil | 2.6-4.4 | 8.26 |
| Example 1 | Activated carbon | Aluminum foil (2.0 V formed) | 2.4-4.2 | 17.9 |
| Example 2 | Activated carbon | Aluminum foil (4.0 V formed) | 2.8-4.4 | 13.3 |
| Example 3 | Activated carbon | Aluminum foil (6.0 V formed) | 2.8-4.4 | 13.0 |
| Example 4 | PMeT | Aluminum foil (6.0 V formed) | 2.2-3.6 | 16.0 |
| Example 5 | PEDOT | Aluminum foil (6.0 V formed) | 2.4-3.8 | 11.7 |

Compared to the devices with symmetric electrode structure comprising the same activated carbon positive and negative electrodes, the devices with asymmetric electrode structure comprising an aluminum foil as the negative electrode possess higher working voltage and energy density, especially those with an aluminum foil negative electrode covered by a protective layer.

TABLE 2

| Ex | Positive electrode | Negative electrode | Working voltage (V) | Energy density (Wh/kg) | Capacity retention (%) (after 500 cycles) |
|---|---|---|---|---|---|
| Comparative Example 4 | Activated carbon | Activated carbon | 0.0-3.2 | 4.77 | 72 |
| Example 2 | Activated carbon | Aluminum foil (4.0 V formed) | 2.8-4.4 | 13.3 | 82.2 |
| Example 3 | Activated carbon | Aluminum foil (6.0 V formed) | 2.8-4.4 | 13.0 | 92.0 |
| Example 4 | PMeT | Aluminum foil (6.0 V formed) | 2.2-3.6 | 16.0 | 87.5 |
| Example 5 | PEDOT | Aluminum foil (6.0 V formed) | 2.4-3.8 | 11.7 | 80.5 |

In Comparative Example 1 and Comparative Example 4 with symmetric electrode structure comprising the same activated carbon positive and negative electrodes, raising the working voltage of device merely increases the energy density from 3.59 Wh/kg to 4.77 Wh/kg. However, the capacity retention thereof is deteriorated. Compared to the devices with symmetric electrode structure comprising the same activated carbon positive and negative electrodes, the devices with asymmetric electrode structure comprising an aluminum foil covered by a protective layer as the negative electrode, possessed higher working voltage, energy density and capacity retention.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An energy storage device, comprising:
    a positive electrode;
    an aluminum negative electrode;
    a protective layer of aluminum oxide or aluminum hydroxide formed on a surface of the aluminum negative electrode; and
    an electrolyte.

2. The energy storage device as claimed in claim 1, wherein the positive electrode comprises fast-energy-storage electrochemical capacitive materials coated on a current collector.

3. The energy storage device as claimed in claim 2, wherein the fast-energy-storage electrochemical capacitive materials comprise activated carbon, conductive polymers or combinations thereof.

4. The energy storage device as claimed in claim 3, wherein the conductive polymers comprise poly(3-methylthiophene) (PMeT) or poly(3,4-ethylenedioxythiophene) (PEDOT).

5. The energy storage device as claimed in claim 2, wherein the current collector comprises aluminum.

6. The energy storage device as claimed in claim 1, wherein the electrolyte comprises lithium salts.

7. The energy storage device as claimed in claim 1, wherein the aluminum negative electrode is an aluminum foil arranged to serve as a current collector.

* * * * *